(12) United States Patent
Kumar et al.

(10) Patent No.: US 10,581,719 B2
(45) Date of Patent: *Mar. 3, 2020

(54) HARDWARE ARCHITECTURE FOR UNIVERSAL TESTING SYSTEM: WIRELESS ROUTER TEST

(71) Applicant: Contec, LLC, Schenectady, NY (US)

(72) Inventors: Samant Kumar, San Jose, CA (US); Shivashankar Diddimani, Karnataka (IN); Hemanth Nekkileru, San Jose, CA (US); James Christopher Collip, Sunnyvale, CA (US); Naresh Chandra Nigam, San Jose, CA (US); Mrinal Mathur, San Jose, CA (US)

(73) Assignee: Contec, LLC, Schenectady, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/400,512

(22) Filed: May 1, 2019

(65) Prior Publication Data
US 2019/0260664 A1    Aug. 22, 2019

Related U.S. Application Data

(63) Continuation of application No. 14/929,220, filed on Oct. 30, 2015, now Pat. No. 10,320,651.

(51) Int. Cl.
*H04L 12/26*  (2006.01)
*H04L 12/413* (2006.01)
*H04L 12/28*  (2006.01)

(52) U.S. Cl.
CPC ........... *H04L 43/50* (2013.01); *H04L 12/413* (2013.01); *H04L 12/2801* (2013.01); *H04L 12/2854* (2013.01)

(58) Field of Classification Search
CPC ... H04L 43/50; H04L 12/413; H04L 12/2801; H04L 12/2854
See application file for complete search history.

(56) References Cited

U.S. PATENT DOCUMENTS

| 5,005,197 A | 4/1991 | Parsons et al. |
| 5,897,609 A | 4/1999 | Choi et al. |
| 5,910,977 A | 6/1999 | Torregrossa |
| 5,917,808 A | 6/1999 | Koshbab |

(Continued)

FOREIGN PATENT DOCUMENTS

| CN | 202261360 | 5/2012 |
| WO | 2001013604 | 2/2001 |

(Continued)

OTHER PUBLICATIONS

Tiwari, Rajeev; Supplemental Notice of Allowance for U.S. Appl. No. 15/624,967, filed Jun. 16, 2017, dated Sep. 19, 2018, 7 pgs.

(Continued)

*Primary Examiner* — Alpus Hsu
*Assistant Examiner* — Camquyen Thai
(74) *Attorney, Agent, or Firm* — Taylor English Duma LLP

(57) ABSTRACT

A hardware architecture for a universal testing system used for performing Wifi tests on wireless devices under test (DUT) is disclosed. According to certain embodiments, test information travels from a Wifi port of the test server to the Wifi port's antenna in a Faraday cage, and then travels over the air to DUT's Wifi antenna in the same Faraday cage, and then to a LAN Ethernet port of the DUT, and then to the test server's Ethernet port.

17 Claims, 5 Drawing Sheets

(56) References Cited

U.S. PATENT DOCUMENTS

| | | |
|---|---|---|
| 6,088,582 A | 7/2000 | Canora et al. |
| 6,308,496 B1 | 10/2001 | Lee |
| 6,367,032 B1 | 4/2002 | Kasahara |
| 6,662,135 B1 | 12/2003 | Burns |
| 6,671,160 B2 | 12/2003 | Hayden |
| 6,826,512 B2 | 11/2004 | Dara-Abrams et al. |
| 6,859,043 B2 | 2/2005 | Ewing |
| 7,068,757 B1 | 6/2006 | Burnett |
| 7,254,755 B2 | 8/2007 | De Obaldia et al. |
| 7,664,317 B1 | 2/2010 | Sowerby |
| 7,809,517 B1 | 10/2010 | Zuckerman |
| 8,121,028 B1 | 2/2012 | Schlesener |
| 8,209,732 B2 | 6/2012 | Le |
| 8,229,344 B1 | 7/2012 | Petersen |
| 8,324,909 B2 | 12/2012 | Oakes |
| 8,418,000 B1 | 4/2013 | Salame |
| 8,418,219 B1 | 4/2013 | Parsons |
| 8,515,015 B2 | 8/2013 | Maffre |
| 8,689,071 B2 | 4/2014 | Valakh |
| 8,806,400 B1 | 8/2014 | Bhawmik |
| 9,013,307 B2 | 4/2015 | Hussain et al. |
| 9,270,983 B1 | 2/2016 | Hare, Jr. |
| 9,316,714 B2 | 4/2016 | Rada |
| 9,319,908 B2 | 4/2016 | Nickel |
| 9,372,228 B2 | 6/2016 | Nickel |
| 9,402,601 B1 | 8/2016 | Berger |
| 9,490,920 B2 | 11/2016 | Parte |
| 9,491,454 B1 | 11/2016 | Kumar |
| 9,571,211 B2 | 2/2017 | Partee |
| 9,602,556 B1 | 3/2017 | Cham |
| 9,609,063 B2 | 3/2017 | Zhu et al. |
| 9,810,735 B2 | 11/2017 | Kumar et al. |
| 9,838,295 B2 | 12/2017 | Kumar et al. |
| 9,900,113 B2 | 2/2018 | Kumar et al. |
| 9,900,116 B2 | 2/2018 | Kumar et al. |
| 9,960,989 B2 | 5/2018 | Kumar et al. |
| 9,992,084 B2 | 6/2018 | Kumar et al. |
| 10,116,397 B2 | 10/2018 | Kumar et al. |
| 10,122,611 B2 | 11/2018 | Kumar et al. |
| 10,158,553 B2 | 12/2018 | Tiwari et al. |
| 10,230,617 B2 | 3/2019 | Kumar et al. |
| 10,277,497 B2 | 4/2019 | Tiwari et al. |
| 10,291,959 B2 | 5/2019 | Kumar et al. |
| 10,298,483 B2 | 5/2019 | Kumar et al. |
| 10,320,651 B2 | 6/2019 | Kumar et al. |
| 2002/0070725 A1 | 6/2002 | Hilliges |
| 2002/0077786 A1 | 6/2002 | Vogel et al. |
| 2003/0005380 A1 | 1/2003 | Nguyen |
| 2003/0184035 A1 | 10/2003 | Yu |
| 2003/0200303 A1 | 10/2003 | Chong |
| 2004/0010584 A1 | 1/2004 | Peterson |
| 2004/0016708 A1 | 1/2004 | Rafferty |
| 2004/0160226 A1 | 8/2004 | Ewing |
| 2004/0189281 A1 | 9/2004 | Le et al. |
| 2004/0203726 A1 | 10/2004 | Wei |
| 2005/0041642 A1 | 2/2005 | Robinson |
| 2005/0053008 A1 | 3/2005 | Griesing |
| 2005/0102488 A1 | 5/2005 | Bullis |
| 2005/0193294 A1 | 9/2005 | Hildebrant |
| 2005/0249196 A1 | 11/2005 | Ansari et al. |
| 2005/0286466 A1 | 12/2005 | Tagg |
| 2006/0015785 A1 | 1/2006 | Chun |
| 2006/0271322 A1 | 11/2006 | Haggerty |
| 2007/0097659 A1 | 5/2007 | Behrens |
| 2007/0220380 A1 | 9/2007 | Ohanyan |
| 2008/0026748 A1 | 1/2008 | Alexander et al. |
| 2008/0117907 A1 | 5/2008 | Hein |
| 2008/0144293 A1 | 6/2008 | Aksamit |
| 2008/0159737 A1 | 7/2008 | Noble et al. |
| 2008/0168520 A1 | 7/2008 | Vanderhoff |
| 2008/0274712 A1 | 11/2008 | Rofougaran |
| 2008/0315898 A1 | 12/2008 | Cannon |
| 2009/0059933 A1 | 3/2009 | Huang et al. |
| 2009/0089854 A1 | 4/2009 | Le |
| 2009/0213738 A1 | 8/2009 | Volpe et al. |
| 2009/0254976 A1 | 10/2009 | Huotari et al. |
| 2009/0282446 A1 | 11/2009 | Breed |
| 2009/0282455 A1 | 11/2009 | Bell et al. |
| 2009/0289020 A1 | 11/2009 | Wurmhoringer |
| 2010/0132000 A1 | 5/2010 | Straub |
| 2010/0138823 A1 | 6/2010 | Thornley |
| 2010/0246416 A1 | 9/2010 | Sinha |
| 2010/0281107 A1 | 11/2010 | Fallows et al. |
| 2011/0001833 A1 | 1/2011 | Grinkemeyer |
| 2011/0006794 A1 | 1/2011 | Sellathamby |
| 2011/0012632 A1 | 1/2011 | Merrow |
| 2011/0035676 A1 | 2/2011 | Tischer |
| 2011/0072306 A1 | 3/2011 | Racey |
| 2011/0090075 A1 | 4/2011 | Armitage et al. |
| 2011/0099424 A1 | 4/2011 | Rivera Trevino |
| 2011/0107074 A1 | 5/2011 | Chan et al. |
| 2011/0116419 A1 | 5/2011 | Cholas |
| 2011/0149720 A1 | 6/2011 | Phuah et al. |
| 2011/0222549 A1 | 9/2011 | Connelly |
| 2011/0267782 A1 | 11/2011 | Petrick et al. |
| 2011/0306306 A1 | 12/2011 | Reed |
| 2012/0140081 A1 | 1/2012 | Clements |
| 2012/0122406 A1 | 5/2012 | Gregg et al. |
| 2012/0163227 A1 | 6/2012 | Kannan |
| 2012/0198084 A1 | 8/2012 | Keskitalo |
| 2012/0198442 A1 | 8/2012 | Kashyap |
| 2012/0213259 A1 | 8/2012 | Renken et al. |
| 2012/0220240 A1 | 8/2012 | Rothschild |
| 2012/0275784 A1 | 11/2012 | Soto |
| 2012/0278826 A1 | 11/2012 | Jones |
| 2012/0306895 A1 | 12/2012 | Faulkner et al. |
| 2013/0014983 A1 | 1/2013 | Korson et al. |
| 2013/0033279 A1 | 2/2013 | Sozanski et al. |
| 2013/0049794 A1 | 2/2013 | Humphrey et al. |
| 2013/0076217 A1 | 3/2013 | Thompson |
| 2013/0093447 A1 | 4/2013 | Nickel |
| 2013/0104158 A1 | 4/2013 | Partee |
| 2013/0152047 A1 | 6/2013 | Moorthi et al. |
| 2013/0160064 A1 | 6/2013 | Van Rozen |
| 2013/0167123 A1 | 6/2013 | Dura |
| 2013/0257468 A1 | 10/2013 | Mlinarsky |
| 2013/0305091 A1 | 11/2013 | Stan et al. |
| 2014/0047322 A1 | 2/2014 | Kim et al. |
| 2014/0091874 A1 | 4/2014 | Cook et al. |
| 2014/0115580 A1 | 4/2014 | Kellerman |
| 2014/0123200 A1 | 5/2014 | Park |
| 2014/0126387 A1 | 5/2014 | Gintis |
| 2014/0156819 A1 | 6/2014 | Cavgalar |
| 2014/0187172 A1 | 7/2014 | Partee |
| 2014/0187173 A1 | 7/2014 | Partee |
| 2014/0207404 A1 | 7/2014 | Fritzsche |
| 2014/0256373 A1 | 9/2014 | Hernandez |
| 2014/0266930 A1 | 9/2014 | Huynh |
| 2014/0269386 A1 | 9/2014 | Chu et al. |
| 2014/0269871 A1 | 9/2014 | Huynh |
| 2014/0282783 A1 | 9/2014 | Totten |
| 2014/0370821 A1 | 12/2014 | Guterman |
| 2015/0024720 A1 | 1/2015 | Efrati |
| 2015/0093987 A1 | 4/2015 | Ouyang |
| 2015/0109941 A1 | 4/2015 | Zhang |
| 2015/0151669 A1 | 6/2015 | Meisner |
| 2015/0180743 A1 | 6/2015 | Jana et al. |
| 2015/0226716 A1 | 8/2015 | Nelson |
| 2015/0237010 A1 | 8/2015 | Roskind |
| 2015/0253357 A1 | 9/2015 | Olgaard |
| 2015/0288589 A1 | 10/2015 | Radford et al. |
| 2015/0369851 A1 | 12/2015 | Even |
| 2016/0080241 A1 | 3/2016 | Rocha De Maria |
| 2016/0102951 A1 | 4/2016 | Cole |
| 2016/0191364 A1 | 6/2016 | Ajitomi |
| 2016/0381818 A1 | 12/2016 | Mills |
| 2017/0048519 A1 | 2/2017 | Friel |
| 2017/0089981 A1 | 3/2017 | Kumar |
| 2017/0093682 A1 | 3/2017 | Kumar |
| 2017/0093683 A1 | 3/2017 | Kumar |
| 2017/0126536 A1 | 5/2017 | Kumar |
| 2017/0126537 A1 | 5/2017 | Kumar |
| 2017/0126539 A1 | 5/2017 | Tiwari et al. |
| 2017/0149635 A1 | 5/2017 | Kumar |

(56) References Cited

U.S. PATENT DOCUMENTS

| | | | |
|---|---|---|---|
| 2017/0149645 | A1 | 5/2017 | Kumar |
| 2017/0195071 | A1 | 7/2017 | Kumar |
| 2017/0250762 | A1 | 8/2017 | Kumar et al. |
| 2017/0288791 | A1 | 10/2017 | Kumar et al. |
| 2017/0288993 | A1 | 10/2017 | Kumar et al. |
| 2017/0289012 | A1 | 10/2017 | Tiwari et al. |
| 2017/0302994 | A1 | 10/2017 | Kumar |
| 2018/0024193 | A1 | 1/2018 | Kumar et al. |
| 2018/0076908 | A1 | 3/2018 | Kumar et al. |
| 2018/0077046 | A1 | 3/2018 | Kumar et al. |
| 2018/0351846 | A1 | 12/2018 | Kumar et al. |
| 2019/0109778 | A1 | 4/2019 | Kumar et al. |
| 2019/0182134 | A1 | 6/2019 | Kumar et al. |
| 2019/0190625 | A1 | 6/2019 | Kumar et al. |
| 2019/0273675 | A1 | 9/2019 | Kumar et al. |

FOREIGN PATENT DOCUMENTS

| | | |
|---|---|---|
| WO | 2013169728 | 11/2013 |
| WO | 2014035462 | 3/2014 |
| WO | 2014065843 | 5/2014 |
| WO | 2017053961 | 3/2017 |
| WO | 2017074872 | 5/2017 |

OTHER PUBLICATIONS

Tiwari, Rajeev; Notice of Allowance for U.S. Appl. No. 15/624,967, filed Jun. 16, 2017, dated Aug. 28, 2018, 6 pgs.
Tiwari, Rajeev; Advisory Action for U.S. Appl. No. 15/624,967, filed Jun. 16, 2017, dated Jul. 17, 2018, 7 pgs.
Tiwari, Rajeev; Final Office Action for U.S. Appl. No. 15/624,967, filed Jun. 16, 2017, dated May 8, 2018, 40 pgs.
Tiwari, Rajeev; Non-Final Office Action for U.S. Appl. No. 15/624,967, filed Jun. 16, 2017, dated Nov. 7, 2017, 52 pgs.
Kumar, Samant; International Preliminary Report on Patentability for PCT Application No. PCT/US2016/053768, dated Sep. 26, 2016, dated Apr. 5, 2018, 13 pgs.
Kumar, Samant; International Search Report and Written Opinion for PCT/US16/53768, filed Sep. 26, 2016, dated Feb. 3, 2017, 17 pgs.
Kumar, Samant; International Search Report and Written Opinion for PCT/US2016/058507, filed Oct. 24, 2016, dated Jan. 3, 2017, 12 pgs.
Kumar, Samant; International Preliminary Report on Patentability for PCT Application No. PCT/US2016/058507, filed Oct. 24, 2016, dated May 11, 2018, 12 pgs.
Kumar, Samant; Issue Notification for U.S. Appl. No. 14/866,780, filed Sep. 25, 2015, dated Oct. 19, 2016, 1 pg.
Kumar, Samant; Notice of Allowance for U.S. Appl. No. 14/866,780, filed Sep. 25, 2015, dated Jul. 19, 2016, 8 pgs.
Kumar, Samant; Advisory Action for U.S. Appl. No. 15/642,915, filed Jul. 6, 2017, dated Jul. 23, 2018, 18 pgs.
Kumar, Samant; Corrected Notice of Allowance for U.S. Appl. No. 15/642,915, filed Jul. 6, 2017, dated Apr. 10, 2019, 7 pgs.
Kumar, Samant; Final Office Action for U.S. Appl. No. 15/642,915, filed Jul. 6, 2017, dated Apr. 5, 2018, 18 pgs.
Kumar, Samant; Issue Notification for U.S. Appl. No. 15/642,915, filed Jul. 6, 2017, dated Apr. 24, 2019, 1 pg.
Kumar, Samant; Non-Final Office Action for U.S. Appl. No. 15/642,915, filed Jul. 6, 2017, dated Oct. 2, 2018, 15 pgs.
Kumar, Samant; Non-Final Office Action for U.S. Appl. No. 15/642,915, filed Jul. 6, 2017, dated Nov. 1, 2017, 42 pgs.
Kumar, Samant; Notice of Allowance for U.S. Appl. No. 15/642,915, filed Jul. 6, 2017, dated Feb. 28, 2019, 11 pgs.
Kumar, Samant; Supplemental Notice of Allowance for U.S. Appl. No. 15/642,915, filed Jul. 6, 2017, dated Mar. 25, 2019, 8 pgs.
Kumar, Samant; Issue Notification for U.S. Appl. No. 14/866,630, filed Sep. 25, 2015, dated Apr. 11, 2018, 1 pg.
Kumar, Samant; Non-Final Office Action for U.S. Appl. No. 14/866,630, filed Sep. 25, 2015, dated Aug. 9, 2017, 24 pgs.
Kumar, Samant; Notice of Allowance for U.S. Appl. No. 14/866,630, filed Sep. 25, 2015, dated Dec. 20, 2017, 19 pgs.
Kumar, Samant; Supplemental Notice of Allowance for U.S. Appl. No. 14/866,630, filed Sep. 25, 2015, dated Jan. 31, 2018, 9 pgs.
Kumar, Samant; Supplemental Notice of Allowance for U.S. Appl. No. 14/866,630, filed Sep. 25, 2015, dated Mar. 30, 2018, 6 pgs.
Kumar, Samant; Corrected Notice of Allowability for U.S. Appl. No. 14/866,752, filed Sep. 25, 2015, dated Jul. 10, 2018, 5 pgs.
Kumar, Samant; Corrected Notice of Allowance for U.S. Appl. No. 14/866,752, filed Sep. 25, 2015, dated Oct. 4, 2018, 5 pgs.
Kumar, Samant; Issue Notification for U.S. Appl. No. 14/866,752, filed Sep. 25, 2015, dated Oct. 17, 2018, 1 pg.
Kumar, Samant; Non-Final Office Action for U.S. Appl. No. 14/866,752, filed Sep. 25, 2015, dated Nov. 7, 2017, 26 pgs.
Kumar, Samant; Notice of Allowance for U.S. Appl. No. 14/866,752, filed Sep. 25, 2015, dated May 17, 2018, 16 pgs.
Kumar, Samant; Corrected Notice of Allowance for U.S. Appl. No. 16/103,546, filed Mar. 25, 2019, dated Mar. 25, 2019, 7 pgs.
Kumar, Samant; Corrected Notice of Allowance for U.S. Appl. No. 16/103,546, filed Aug. 14, 2018, dated Apr. 9, 2019, 6 pgs.
Kumar, Samant; Notice of Allowance for U.S. Appl. No. 16/103,546, filed Aug. 14, 2018, dated Jan. 28, 2019, 36 pgs.
Kumar, Samant; Certificate of Correction for U.S. Appl. No. 14/866,720, filed Sep. 25, 2015, dated Feb. 13, 2018, 1 pg.
Kumar, Samant; Issue Notification for U.S. Appl. No. 14/866,720, filed Sep. 25, 2015, dated Oct. 18, 2017, 1 pg.
Kumar, Samant; Non-Final Office Action for U.S. Appl. No. 14/866,720, filed Sep. 25, 2015, dated Jan. 23, 2017, 17 pgs.
Kumar, Samant; Notice of Allowance for U.S. Appl. No. 14/866,720, filed Sep. 25, 2015, dated Jun. 29, 2017, 26 pgs.
Kumar, Samant; Notice of Allowance for U.S. Appl. No. 14/866,720, filed Sep. 25, 2015, dated Aug. 28, 2017, 11 pgs.
Kumar, Samant; Response to Rule 312 Communication for U.S. Appl. No. 14/866,720, filed Sep. 25, 2015, dated Jul. 26, 2017, 2 pgs.
Kumar, Samant; Final Office Action for U.S. Appl. No. 15/722,235, filed Oct. 2, 2017, dated Jul. 2, 2019, 18 pgs.
Kumar, Samant; Non-Final Office Action for U.S. Appl. No. 15/722,235, filed Oct. 2, 2017, dated Jan. 8, 2019, 62 pgs.
Kumar, Samant; Ex-Parte Quayle Office Action for U.S. Appl. No. 14/948,925, filed Nov. 23, 2015, dated Jun. 20, 2017, 29 pgs.
Kumar, Samant; Issue Notification for U.S. Appl. No. 14/948,925, filed Nov. 23, 2015, dated Nov. 16, 2017, 1 pg.
Kumar, Samant; Notice of Allowance for U.S. Appl. No. 14/948,925, filed Nov. 23, 2015, dated Sep. 20, 2017, 15 pgs.
Kumar, Samant; Supplemental Notice of Allowance for U.S. Appl. No. 14/948,925, filed Nov. 23, 2015, dated Oct. 5, 2017, 2 pgs.
Kumar, Samant; Corrected Notice of Allowance for U.S. Appl. No. 15/813,838, filed Nov. 15, 2017, dated Feb. 12, 2019, 6 pgs.
Kumar, Samant; Issue Notification for U.S. Appl. No. 15/813,838, filed Nov. 15, 2017, dated Jan. 9, 2019, 1 pg.
Kumar, Samant; Issue Notification for U.S. Appl. No. 15/813,838, filed Nov. 15, 2017, dated Feb. 20, 2019, 1 pg.
Kumar, Samant; Notice of Allowance for U.S. Appl. No. 15/813,838, filed Nov. 15, 2017, dated Oct. 2, 2018, 52 pgs.
Kumar, Samant; Issue Notification for U.S. Appl. No. 14/948,143, filed Nov. 20, 2015, dated May 16, 2018, 1 pg.
Kumar, Samant; Non-Final Office Action for U.S. Appl. No. 14/948,143, filed Nov. 20, 2015, dated Dec. 28, 2017, 39 pgs.
Kumar, Samant; Notice of Allowance for U.S. Appl. No. 14/948,143, filed Nov. 20, 2015, dated Jan. 25, 2018, 13 pgs.
Kumar, Samant; Supplemental Notice of Allowance for U.S. Appl. No. 14/948,143, dated Nov. 20, 2015, dated May 7, 2018.
Kumar, Samant; Final Office Action for U.S. Appl. No. 15/624,950, filed Jun. 16, 2017, dated Dec. 20, 2018, 33 pgs.
Kumar, Samant; Non-Final Office Action for U.S. Appl. No. 15/624,950, filed Jun. 16, 2017, dated Jul. 9, 2018, 50 pgs.
Kumar, Samant; Non-Final Office Action for U.S. Appl. No. 16/278,534, filed Feb. 18, 2019, dated Jun. 11, 2019, 25 pgs.
Kumar, Samant; Corrected Notice of Allowance for U.S. Appl. No. 14/987,538, filed Jan. 4, 2016, dated Jan. 10, 2018, 8 pgs.
Kumar, Samant; Issue Notification for U.S. Appl. No. 14/987,538, filed Jan. 4, 2016, dated Jan. 31, 2018, 1 pg.

(56) References Cited

OTHER PUBLICATIONS

Kumar, Samant; Non-Final Office Action for U.S. Appl. No. 14/987,538, filed Jan. 4, 2016, dated Jan. 21, 2017, 18 pgs.
Kumar, Samant; Notice of Allowance for U.S. Appl. No. 14/987,538, filed Jan. 4, 2016, dated Dec. 4, 2017, 20 pgs.
Consumer Electronics Net; Article entitled: "Teleplan Enhances Test Solution Portfolio with Titan", located at <http://www.consumerelectronicsnet.com/article/Teleplan-Enhances-Test-Solution-Portfolio-With-Titan-4673561>, published on Nov. 1, 2016, 3 pgs.
Promptlink; Article entitled: "Set-Top Box Test Platform", located at <http://promptlink.com/products/stbtp.html>, earliest known publication date Aug. 11, 2016, 7 pgs.
Exact Ventures; Report entitled: North American Telecommunications Equipment Repair Market, located at http://www.fortsol.com/wp-content/uploads/2016/08/Exact-Ventures-NA-Repair-Market-Report.pdf>, earliest known publication date Aug. 1, 2016, 12 pgs.
Promptlink; Article entitled: "Cable Modem Test Platform", located at <https://www.promptlink.com/products/cmtp.html>, earliest known publication date Aug. 11, 2016, 10 pgs.
Digital Producer; Article entitled: "S3 Group Unveils Exclusive Partnership in North America With First US StormTest(TM) Decision Line Customer", located at . . . <see comment section>.
CED Magazine; Article entitled: "Cable Connects in Atlanta", located at <https://www.cedmagazine.com/article/2006/04/cable-connects-atlanta>, Apr. 30, 2006, 21 pgs.
Teleplan; Article entitled: "Screening & Testing", located at <https://www.teleplan.com/innovative-services/screening-testing/>, earliest known publication date Mar. 21, 2015, 7 pgs.
Electronic Design; Article entitled: "Testing of MPEG-2 Set-Top Boxes Must be Fast, Thorough", located at <http://www.electronicdesign.com/print/839>, published Nov. 18, 2001, 9 pgs.
S3 Group; Document entitled: "White Paper: The Importance of Automated Testing in Set-Top Box Integration", earliest known publication date Jun. 17, 2014, 11 pgs.
Tvtechnology; Article entitled: "S3 Group's StormTest", located at <http://www.tvtechnology.com/expertise/0003/s3-groups-stormtest/256690>, published May 1, 2012, 2 pgs.
Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date—May 30, 2013, 2 pgs.
Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.
Businesswire; Article entitled: "GENBAND and CTDI Settle Legal Dispute", located at <http://www.businesswire.com/news/home/20140321005528/en/GENBAND-CTDI-Settle-Legal-Dispute>, Mar. 21, 2014, 1 pg.
Kumar, Samant; Response to Amendment under Rule 312 for U.S. Appl. No. 14/987,538, filed Jan. 4, 2016, dated Jan. 17, 2018, 2 pgs.
Kumar, Samant; Notice of Allowance for U.S. Appl. No. 14/987,538, filed Jan. 4, 2016, dated Mar. 23, 2017, 7 pgs.
Kumar, Samant; Issue Notification for U.S. Appl. No. 15/624,961, filed Jun. 16, 2017, dated Oct. 10, 2018, 1 pg.
Kumar, Samant; Corrected Notice of Allowance for U.S. Appl. No. 15/624,961, filed Jun. 16, 2017, dated Sep. 28, 2018, 9 pgs.
Kumar, Samant; Corrected Notice of Allowance for U.S. Appl. No. 15/624,961, filed Jun. 16, 2017, dated Jun. 28, 2018, 7 pgs.
Kumar, Samant; Notice of Allowance for U.S. Appl. No. 15/624,961, filed Jun. 16, 2017, dated May 22, 2018, 44 pgs.
Kumar, Samant; Notice of Non-Compliant Amendment for U.S. Appl. No. 15/624,961, filed Jun. 16, 2017, dated Jan. 10, 2018, 5 pgs.
Kumar, Samant; Non-Final Office Action for U.S. Appl. No. 15/624,961, filed Jun. 16, 2017, dated Jul. 19, 2017, 7 pgs.
Kumar, Samant; Non-Final Office Action for U.S. Appl. No. 14/929,180, filed Oct. 30, 2015, dated Oct. 1, 2018, 15 pgs.

Kumar, Samant; Advisory Action for U.S. Appl. No. 14/929,180, filed Oct. 30, 2015, dated Jul. 27, 2018, 9 pgs.
Kumar, Samant; Final Office Action for U.S. Appl. No. 14/929,180, filed Oct. 30, 2015, dated May 8, 2018, 35 pgs.
Kumar, Samant; Non-Final Office Action for U.S. Appl. No. 14/929,180, filed Oct. 30, 2015, dated Aug. 22, 2017, 32 pgs.
Kumar, Samant; Supplemental Notice of Allowance for U.S. Appl. No. 14/929,220, filed Oct. 30, 2015, dated May 6, 2019, 7 pgs.
Kumar, Samant; Supplemental Notice of Allowance for U.S. Appl. No. 14/929,220, filed Oct. 30, 2015, dated Apr. 12, 2019, 7 pgs.
Kumar, Samant; Notice of Allowance for U.S. Appl. No. 14/929,220, filed Oct. 30, 2015, dated Feb. 19, 2019, 24 pgs.
Kumar, Samant; Non-Final Office Action for U.S. Appl. No. 14/929,220, filed Oct. 30, 2015, dated Oct. 1, 2018, 13 pgs.
Kumar, Samant; Advisory Action for U.S. Appl. No. 14/929,220, filed Oct. 30, 2015, dated Jul. 27, 2018, 8 pgs.
Kumar, Samant; Final Office Action for U.S. Appl. No. 14/929,220, filed Oct. 30, 2015, dated May 10, 2018, 38 pgs.
Kumar, Samant; Non-Final Office Action for U.S. Appl. No. 14/929,220, filed Oct. 30, 2015, dated Mar. 24, 2017, 31 pgs.
Kumar, Samant; Issue Notification for U.S. Appl. No. 15/057,085, filed Feb. 29, 2016, dated Jan. 31, 2018.
Kumar, Samant; Corrected Notice of Allowance for U.S. Appl. No. 15/057,085, filed Feb. 29, 2016, dated Oct. 31, 2017, 6 pgs.
Kumar, Samant; Notice of Allowance for U.S. Appl. No. 15/057,085, filed Feb. 29, 2016, dated Sep. 29, 2017, 28 pgs.
Kumar, Samant; Non-Final Office Action for U.S. Appl. No. 15/057,085, filed Feb. 29, 2016, dated Apr. 7, 2017, 15 pgs.
Kumar, Samant; Advisory Action for U.S. Appl. No. 15/818,803, filed Nov. 21, 2017, dated Feb. 5, 2019, 13 pgs.
Kumar, Samant; Final Office Action for U.S. Appl. No. 15/818,803, filed Nov. 21, 2017, dated Nov. 26, 2018, 20 pgs.
Kumar, Samant; Non-Final Office Action for U.S. Appl. No. 15/818,803, filed Nov. 21, 2017, dated Jul. 25, 2018, 46 pgs.
Kumar, Samant; Non-Final Office Action for U.S. Appl. No. 16/283,340, filed Feb. 22, 2019, dated Jun. 12, 2019, 51 pgs.
Tiwari, Rajeev; Issue Notification for U.S. Appl. No. 15/348,920, filed Nov. 10, 2016, dated Apr. 10, 2019, 1 pg.
Tiwari, Rajeev; Corrected Notice of Allowance for U.S. Appl. No. 15/348,920, filed Nov. 10, 2016, dated Mar. 27, 2019, 13 pgs.
Tiwari, Rajeev; Corrected Notice of Allowance for U.S. Appl. No. 15/348,920, filed Nov. 10, 2016, dated Feb. 26, 2019, 8 pgs.
Tiwari, Rajeev; Notice of Allowance for U.S. Appl. No. 15/348,920, filed Nov. 10, 2016, dated Dec. 4, 2018, 11 pgs.
Tiwari, Rajeev; Non-Final Office Action for U.S. Appl. No. 15/348,920, filed Nov. 10, 2016, dated Aug. 24, 2018, 10 pgs.
Tiwari, Rajeev; Advisory Action for U.S. Appl. No. 15/348,920, filed Nov. 10, 2016, dated Jul. 17, 2018, 8 pgs.
Tiwari, Rajeev; Final Office Action for U.S. Appl. No. 15/348,920, filed Nov. 10, 2016, dated Apr. 30, 2018, 34 pgs.
Tiwari, Rajeev; Non-Final Office Action for U.S. Appl. No. 15/348,920, filed Nov. 10, 2016, dated Nov. 20, 2017, 53 pgs.
Nordman, Bruce, "Testing Products with Network Connectivity," Jun. 21, 2011 [retrieved online at http://citeseerx.is1.psu.edu/viewdoc/download?doi=10.1.1.695.772&rep=rep1&type=pdf on Feb. 6, 2017], 20 pgs.
Tiwari, Rajeev; Issue Notification for U.S. Appl. No. 15/624,967, filed Jun. 16, 2017, dated Nov. 29, 2018, 1 pg.
Kumar, Samant; Advisory Action for U.S. Appl. No. 15/722,235, filed Oct. 2, 2017, dated Sep. 18, 2019, 4 pgs.
Kumar, Samant; Notice of Allowance for U.S. Appl. No. 15/722,235, filed Oct. 2, 2017, dated Oct. 16, 2019, 17 pgs.
Kumar, Samant; Non-Final Office Action for U.S. Appl. No. 16/215,689, filed Dec. 11, 2018, dated Oct. 29, 2019, 53 pgs.
Kumar, Samant; Final Office Action for U.S. Appl. No. 16/283,340, filed Feb. 22, 2019, dated Aug. 13, 2019, 19 pgs.
Kumar, Samant; Supplemental Notice of Allowance for U.S. Appl. No. 15/722,235, filed Oct. 2, 2017, dated Dec. 4, 2019, 6 pgs.
Kumar, Samant; Notice of Allowance for U.S. Appl. No. 16/215,689, filed Dec. 11, 2018, dated Nov. 13, 2019, 11 pgs.
Kumar, Samant; Final Office Action for U.S. Appl. No. 16/278,534, filed Feb. 18, 2019, dated Jan. 7, 2020, 34 pgs.

HARDWARE ARCHITECTURE FOR UNIVERSAL TESTING SYSTEM: WIRELESS ROUTER TEST

CROSS REFERENCE TO RELATED APPLICATIONS

This application is a continuation of U.S. patent application Ser. No. 14/929,220, filed Oct. 30, 2015 and published May 4, 2019 as U.S. Patent Application Publication No. 2017/0126537.

This application is related to U.S. patent application Ser. No. 14/866,630, filed Sep. 25, 2015, now U.S. Pat. No. 9,960,980, and to U.S. patent application Ser. No. 14/866,720, filed Sep. 25, 2015, now U.S. Pat. No. 9,810,735, and to U.S. patent application Ser. No. 14/866,752, filed Sep. 25, 2015, now U.S. Pat. No. 10,122,611, and to U.S. patent application Ser. No. 14/866,780, filed Sep. 25, 2015, now U.S. Pat. No. 9,491,454, and to U.S. patent application Ser. No. 14/929,180, filed Oct. 30, 2015 and published May 4, 2017 as U.S. Patent Application Publication No. 2017/0126536, each of which is hereby incorporated by reference in its entirety. This application is also related to U.S. patent application Ser. No. 14/948,143, filed Nov. 20, 2015, now U.S. Pat. No. 9,992,084, and to U.S. patent application Ser. No. 14/948,925, filed Nov. 23, 2015, now U.S. Pat. No. 9,838,295, and to U.S. patent application Ser. No. 14/987,538, filed Jan. 4, 2016, now U.S. Pat. No. 9,900,116.

TECHNICAL FIELD

The present invention is directed to a system for testing devices.

DETAILED DESCRIPTION

Methods, systems, user interfaces, and other aspects of the invention are described. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention. The specification and drawings are, accordingly, to be regarded in an illustrative rather than a restrictive sense.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Figure 1:
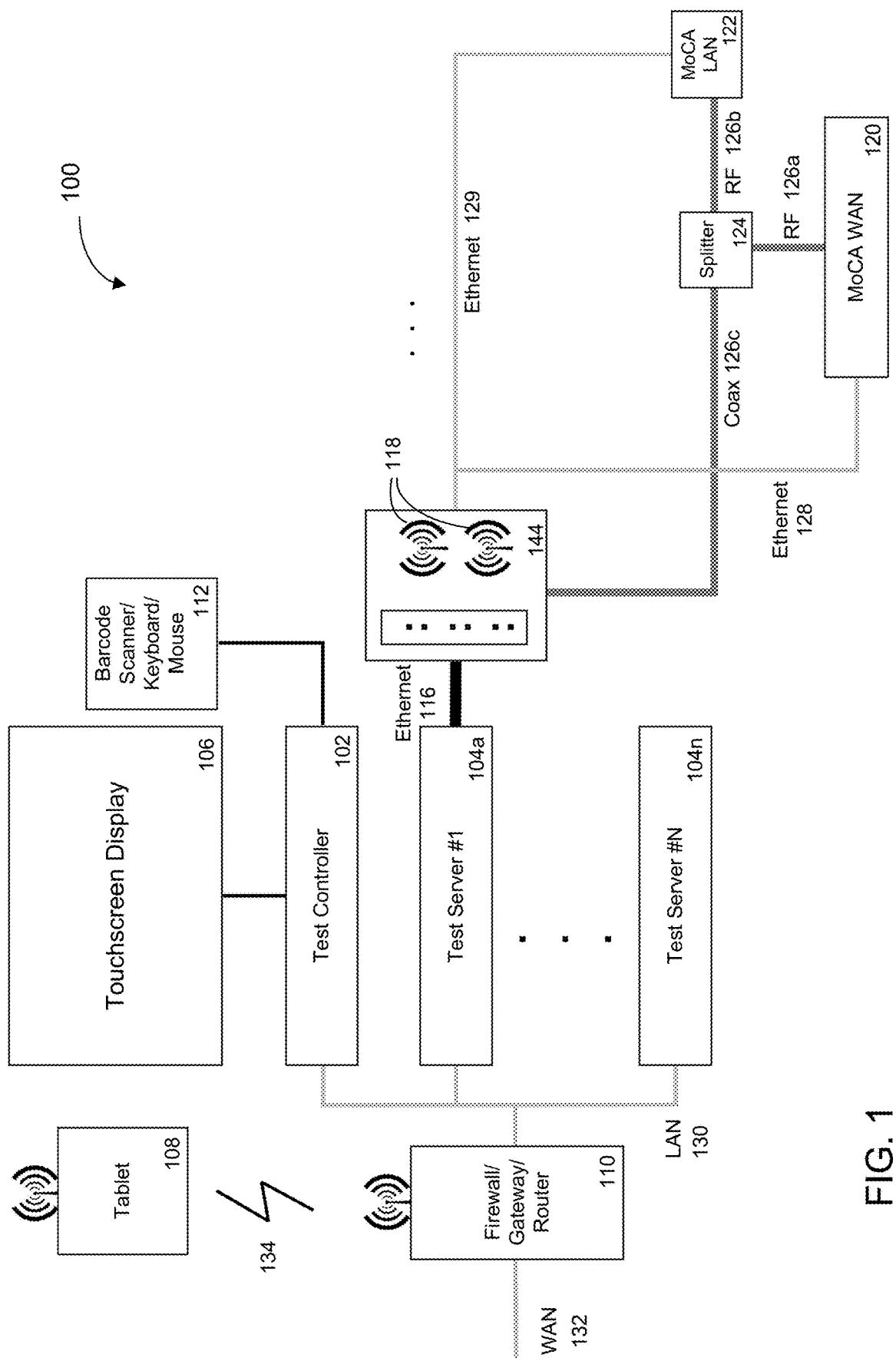
FIG. 1 illustrates a high-level hardware architecture of a universal testing system for wireless routers tests, according to certain embodiments.

FIG. 1 illustrates a high-level hardware architecture of a universal testing system for wireless routers tests, according to certain embodiments. FIG. 1 shows a test station 100 that includes a test control computer 102 (test controller), a plurality of test servers 104a-104n, non-limiting examples of user interfaces that can include touch screen display 106, bar code scanners/keyboard/mouse (112), a remote tablet 108. Each of the plurality of test servers 104a-104n is associated with at least one Faraday cage. Each Faraday cage, is in turn, associated with several physical test slots, in each of which can be installed a device (e.g., wireless router) to be tested. Each installed device in the various physical slots is also referred to as a device under test (DUT). For ease of explanation and to avoid overcrowding the drawing of FIG. 1, FIG. 1 shows only one of the Faraday cages 114. Each Faraday cage 114 is associated with a MOCA Wan harness 120, a MOCA LAN harness 122 and a radio frequency (RF) splitter 124. According to certain embodiments, MOCA LAN harness 122 is connected to RF splitter 124 via RF cable 126b. MOCA WAN harness 120 is connected to RF splitter 124 via RF cable 126a. RF splitter 124 is connected to Faraday cage 114 via COAX cable 126c. Faraday cage 114 has Ethernet connections to its associated test server. MOCA LAN harness 122 also has an Ethernet connection 129 to the associated test server. MOCA WAN harness 120 also has an Ethernet connection 128 to the associated test server. Test control computer 102 and test servers 104a-104n have a LAN 130 (Local Area Network) connection to a firewall/gateway/router 110, which in turn is connected to a WAN 132 (Wide Area Network). A user can optionally use remote wireless tablet 108 to interface with test station 100 remotely through a wireless communication 134 to firewall/gateway/router 110. According to certain embodiments, the firewall isolates the test framework of the testing system.

According to certain embodiments, the testing system comprises at least one test station. According to certain embodiments, each test station includes a plurality of Faraday cages wherein each Faraday cage includes a plurality of physical slots for testing devices. As a non-limiting example, a subset of the plurality of physical slots is associated with a corresponding test server. As a non-limiting example, a test station may have four test servers, each of which is associated with a Faraday cage, which in turn is associated with a set of four physical slots of the plurality of physical slots. The embodiments are not restricted to four test servers. Further, embodiments are not restricted to one Faraday cage per test server, nor are the embodiments restricted to four physical slots per Faraday cage. The number of test servers, Faraday cages, and physical slots may vary from implementation to implementation. According to certain embodiments, each test server includes virtualization containers that act as probes for testing devices installed in the physical slots in the test station.

According to certain embodiments, several wireless devices can be tested simultaneously in the test station.

According to certain embodiments, the user interface can communicate through web sockets with the test system. Such communication is in real-time, bi-directional and asynchronous so that the user can control and monitor the testing of multiple devices simultaneously and independently of each other using the same universal testing system.

According to certain embodiments, the testing system is capable of testing a set of similar types of devices or a set of disparate devices.

According to certain embodiments, test controller 102 is a computer subsystem that manages the user interfaces of the testing system. Thus, at least the following devices are connected to test controller 102: touch screen display 106, and bar code scanners/keyboard/mouse 112.

According to certain embodiments, touch screen display 106 is a touch-enabled screen that senses user/operator inputs for a given DUT. For example, each DUT is represented on the touch screen display as a window that includes test related information such as test progress and test results. As another non-limiting example, a user/operator can use touch screen display 106 to input light emitting diode (LED) status (is the LED lit or not lit) when the user/operator is prompted for inputs as part of the testing procedure of a given DUT.

According to certain embodiments, one or more the bar code scanners 112 can be used to read DUT information such as serial number of the DUT, and default Wifi passwords associated with the given DUT. Such information is needed to conduct testing on the given DUT.

According to certain embodiments, test controller 102 includes an Ethernet interface to connect to the plurality of test servers 104a-104n. Test controller 102 communicates with the plurality of test servers 104a-104n using such an Ethernet interface in order to conduct tests on the various DUTs that are installed in test station 100.

According to certain embodiments, keyboard/mouse 112 are part of test controller 102 and can be used by the user/operator to input data needed to run the tests on the various DUTs installed in test station 100.

According to certain embodiments, each test server of the plurality of test servers 104a-104n provides interfaces (hardware ports) needed to conduct one or more tests on the DUTs. Depending on the type of test, a given test may need a single port or multiple ports as part of the test infrastructure. According to certain embodiments, such ports are controlled by virtualization containers at the test servers.

According to certain embodiments, a given test server includes the following devices: PCI/PCI Express/Mini PCI Express slots, Ethernet connectivity hardware and software.

According to certain embodiments, the PCI/PCI Express/Mini PCI Express slots allow Wifi cards to be installed on a given test server to provide Wifi connectivity in order to perform Wifi tests on the DUTs. Such slots can also be used to install Ethernet cards to provide Ethernet ports in order to perform tests on the DUTs. According to certain embodiments, such PCI/PCI Express/Mini PCI Express slots can host a set of ports that can be associated with a corresponding set of virtualization containers on the test servers. Such virtualization containers are used for testing various features on the DUTs such as Wifi, LAN, WAN, or MoCa interfaces of a given DUT.

According to certain embodiments, the voice port associated with the FXO card is used for testing VoIP connection and functions.

According to certain embodiments, Ethernet connectivity hardware and software are provided in order to connect the test controller computer to the plurality of test servers for controlling the plurality of test servers.

According to certain embodiments, the test servers run test scripts to perform one or more tests such as: 1) testing Ethernet data throughput speeds, 2) testing WiFi throughput speeds, 3) testing MOCA throughput speeds, 4) testing voice over IP (VOIP) connections and functions, 5) testing MIMO (multi input, multi output) antenna technology, according to certain embodiments. According to certain embodiments, the test servers use virtualization containers to run such tests.

Figure 2A:
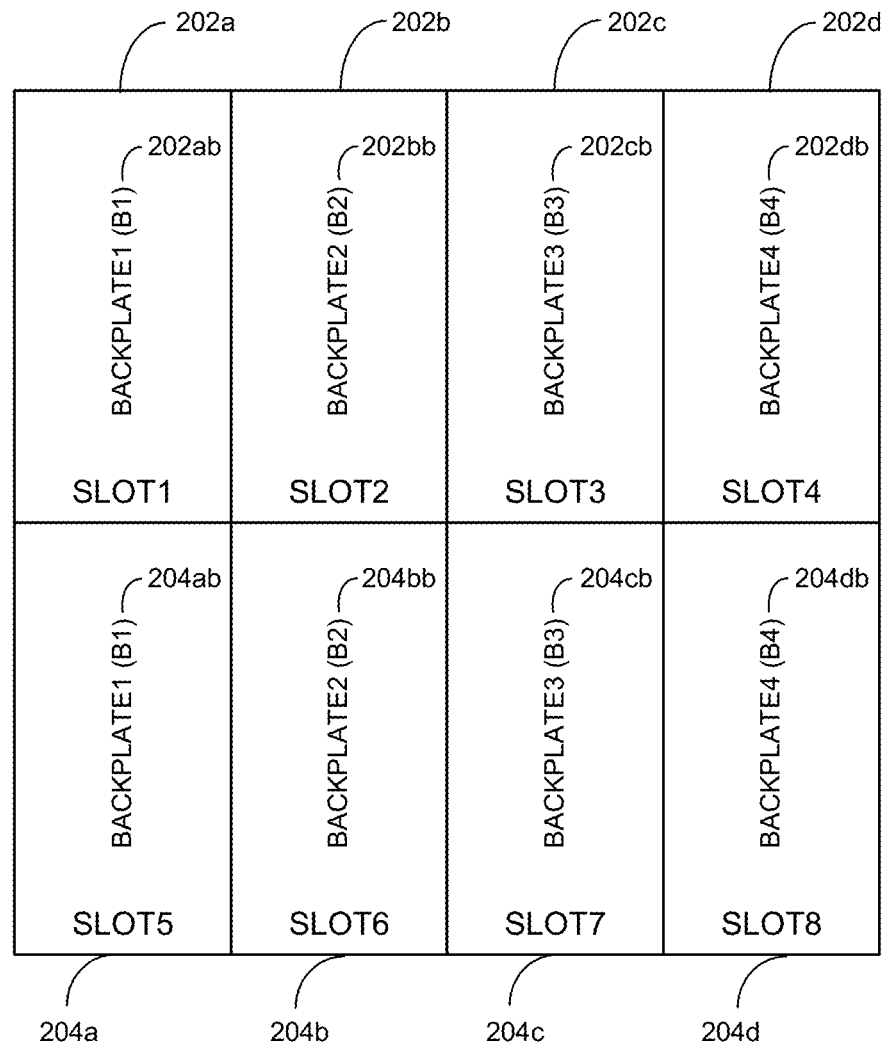
FIG. 2A and FIG. 2B are high-level schematics of a front view of a set of Faraday cages of a universal testing system, according to certain embodiments.
Figure 2B:
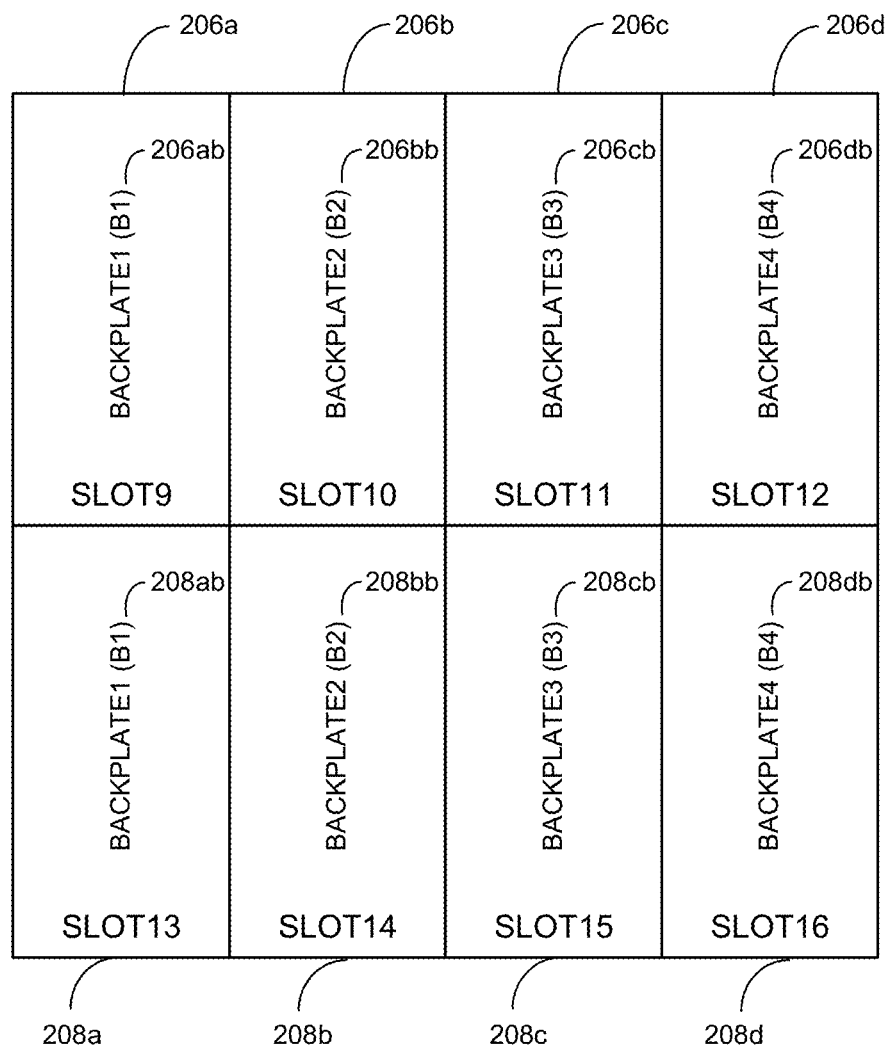

FIG. 2A and FIG. 2B are high-level schematics of a front view of a set of Faraday cages of a universal testing system, according to certain embodiments. FIG. 2A shows two Faraday cages (202, 204) of the plurality of Faraday cages of the universal testing system according to certain embodiments. Faraday cage 202 comprises a number of physical slots, such as slots 202a, 202b, 202c, 202d. Each slot of Faraday cage 202 has a backplate (202ab, 202bb, 202cd, 202db). Faraday cage 204 comprises a number of physical slots, such as slots 204a, 204b, 204c, 204d. Each slot of Faraday cage 204 has a backplate (204ab, 204bb, 204cd, 204db). Backplates are also known as backplanes.

Similarly, FIG. 2B shows two Faraday cages (206, 208) of the plurality of Faraday cages of the universal testing system, according to certain embodiments. Faraday cage 206 comprises a number of physical slots, such as slots 206a, 206b, 206c, 206d. Each slot of Faraday cage 206 has a backplate (206ab, 206bb, 206cd, 206db). Faraday cage 208 comprises a number of physical slots, such as slots 208a, 208b, 208c, 208d. Each slot of Faraday cage 204 has a backplate (208ab, 208bb, 208cd, 208db). Sample backplates are described herein with reference to FIG. 3 herein.

Figure 3:
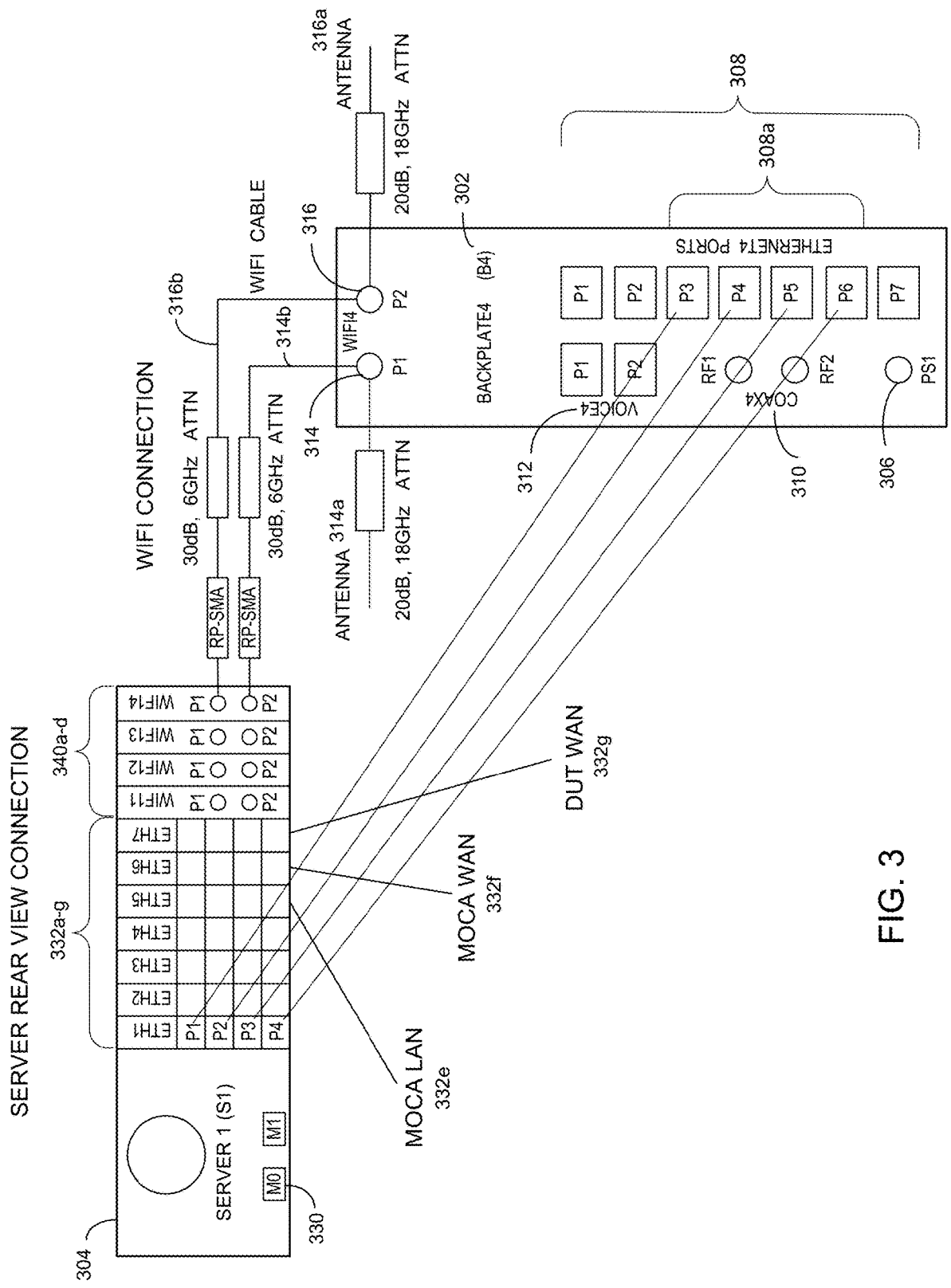
FIG. 3 is a high level schematic that illustrates the connectivity features of backplates (also known as backplanes) of physical slots to test servers, according to certain embodiments.

FIG. 3 is a high-level schematic that illustrates the connectivity features of backplates of physical slots relative to test servers, according to certain embodiments. For ease of explanation, FIG. 3 shows the connectivity of one backplate of the plurality of backplates to one test server of the plurality of test servers in the universal testing system, according to certain embodiments. As previously described, there are a plurality of test servers and a plurality of slots (and corresponding backplates) per test server, according to certain embodiments.

FIG. 3 shows a backplate 302 associated with a give slot that is, in turn, associated with a test server 304 in the universal testing system. Backplate 302 includes but is not limited to a power supply port 306, a set of ports 308, a subset of which are Ethernet ports 308a, a set of coaxial ports 310, a set of voice ports 312, and a set of Wifi ports (314, 316). Server 304 includes but is not limited to a master Internet port 330, a set of Ethernet card ports 332a-g, of which 4 ports (332a-d) are Ethernet LAN ports, one Ethernet MOCA LAN port 332e, one Ethernet MOCA WAN port 332f, and one DUT WAN port 332g. Test server 304 also includes a set of WiFi card ports 340a-d. One or more of the WiFi card ports 340a-d can be associated with a Wifi virtualization container on test server 304 for use in Wifi tests of the DUT, according to certain embodiments.

According to certain embodiments, port P3 of Ethernet ports 308a is associated with port P1 of Ethernet card ports 332a. Similarly, port P4 of Ethernet ports 308a is associated with port P2 of Ethernet card ports 332a. Port P5 of Ethernet ports 308a is associated with port P3 of Ethernet card ports 332a. Port P6 of Ethernet ports 308a is associated with port P4 of Ethernet card ports 332a.

According to certain embodiments, Wifi port 314 is associated with an antenna 314a and is also associated with port P2 of Wifi card port 340d via Wifi cable 314b, for example. Wifi port 316 is associated with an antenna 316a and is also associated with port P1 of Wifi card port 340d via Wifi cable 316b.

According to certain embodiments, a given DUT that is installed in a given slot is connected via coaxial ports 310 to the MOCA WAN Ethernet port (332f) and MOCA LAN Ethernet port (332e) via a corresponding MOCA WAN harness and a MOCA LAN harness, described in greater detail below.

Figure 4:
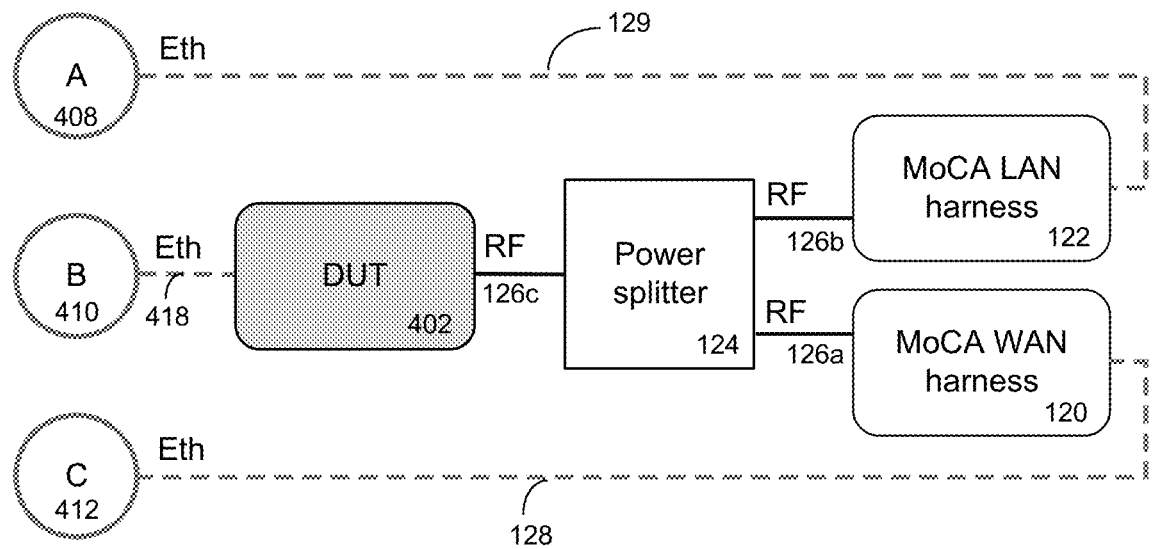
FIG. 4 is a high-level schematic of connectivity of a given DUT with a MOCA LAN harness and a MOCA WAN harness, according to certain embodiments.

FIG. 4 is a high-level schematic of connectivity of a given DUT (installed in a given slot) to a MOCA LAN harness and a MOCA WAN harness, according to certain embodiments. FIG. 4 shows MOCA WAN harness 120 and MOCA LAN harness 122 that are used for testing the MOCA WAN interface and the MOCA LAN interface, respectively, of DUT 402. MOCA WAN harness 120 and MOCA LAN harness 122 are connected to a power splitter 124 via RF cable 126a and RF cable 126b, respectively, according to certain embodiments. Power splitter 124 connects the MOCA LAN and MOCA WAN to DUT 402 via ale RF cable 126c. According to certain embodiments, MOCA WAN harness 120 is also connected via Ethernet cable 128 to an Ethernet port 412 of a test server, where such an Ethernet port 412 is associated with a virtualization container on the test server. Similarly, MOCA LAN harness 122 is also connected via Ethernet cable 129 to an Ethernet port 408 of a test server, where such an Ethernet port 408 is associated with a virtualization container on the test server, according to certain embodiments. Further, DUT 402 is also connected to the test server via RF cable 418 to an Ethernet port 410 of the server that is associated with a virtualization container.

For example, test information (and/or other related information) can flow from Ethernet port 410 (and associated virtualization container) to DUT 402 and then to the MOCA LAN interface of MOCA LAN harness 122 and then to Ethernet port 408 (and associated virtualization container). Test information (and/or other related information) can also flow from Ethernet port 408 (and associated virtualization container) to the MOCA LAN interface of MOCA LAN harness 122, and then to DUT 402, and then to Ethernet port 410 (and associated virtualization container).

Similarly, test information (and other related information) can flow from Ethernet port 410 (and associated virtualization container) to DUT 402 and then to the MOCA WAN interface of MOCA WAN harness 120 and then to Ethernet port 412 (and associated virtualization container). Test information (and/or other related information) can also flow from Ethernet port 412 (and associated virtualization container) to the MOCA WAN interface of MOCA WAN harness 120, and then to DUT 402, and then to Ethernet port 410 (and associated virtualization container).

Figure 5:
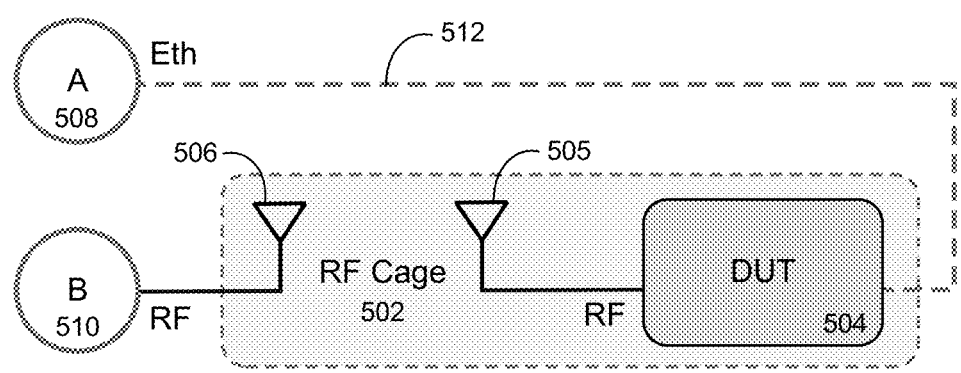
FIG. 5 is a high-level schematic that illustrates a Wifi test hardware setup, according to certain embodiments.

FIG. 5 is a high-level schematic that illustrates a Wifi test hardware setup, according to certain embodiments. FIG. 5 shows a Faraday cage 502 and a DUT 504. FIG. 5 also shows a Wifi antenna 506 that is associated with a Wifi card port (510) of a given test server. According to certain embodiments, such a Wifi card port (510) is associated with a virtualization container on the given test server. Such a virtualization container is for running Wifi tests on the DUT. According to certain embodiments, Wifi antenna 506 is in Faraday cage 504 along with the DUT's Wifi antenna 505. DUT 504 may be placed inside Faraday cage 502 or outside Faraday cage 502. FIG. 5 also shows that one of the LAN Ethernet ports of the DUT is connected via Ethernet cable 512 to the test server's Ethernet port (508), which in turn is associated with a virtualization container for handling such an Ethernet port. As a non-limiting example, test information (and other related information) can be sent via RF cable from Wifi card port 510 to antenna 506. The data then travels over the air to antenna 505 (DUT's Wifi antenna), and then to LAN Ethernet port of the DUT, and then to the test server's Ethernet port (508) via Ethernet cable 512. Thus, the test server can perform Wifi test information measurements.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A test system for simultaneously and independently testing a plurality of wireless devices under test, the test system comprising:
a test controller for managing a user interface associated with the test system;
a test server connected to the test controller; and
a plurality of faraday cages, each faraday cage of the plurality of faraday cages configured to receive a wireless device under test of a plurality of wireless devices under test and having associated with it, a set of ports for connecting a faraday cage to a wireless device under test associated with the faraday cage and to the test server, each set of ports comprising:
a wireless port associated with an antenna internal to the faraday cage and connected to a wireless port on the test server, the wireless port on the test server being associated with a virtualization container for running wireless tests,
a networking port associated with a networking port on the associated wireless device under test and connected to a networking port on the test server, the networking port on the test server being associated with a virtualization container for running networking tests,
wherein the test controller employs web sockets to communicate with the test server such that the plurality of wireless devices under test may be tested simultaneously and independently of each other and that communication between the user interfaces and the test server is real-time, bidirectional, and asynchronous.

2. The test system of claim 1, wherein each set of ports further comprises a radio frequency port associated with a radio frequency port on an associated wireless device under test, and further comprising:
a Multimedia Over Coax Alliance (MoCA) Wide Area Network (WAN) harness associated with a first networking port on the test server;
a MoCA Local Area Network (LAN) harness associated with a second networking port on the test server; and
a splitter connected to the MoCA WAN harness, the MoCA LAN harness, and the radio frequency port on the faraday cage.

3. The test system of claim 2, wherein the radio frequency port on the associated wireless device under test comprises a coax connector.

4. The test system of claim 1, wherein the networking ports comprise Ethernet ports.

5. The test system of claim 1, wherein a signal path for the wireless tests is from the wireless port on the test server to the wireless port on the faraday cage to the antenna internal to the faraday cage to an antenna of the wireless device under test to the networking port of the wireless device under test to the networking port of the test server.

6. A test station for testing a plurality of wireless devices, comprising:

a test controller,
a test server connected to the test controller, and
a plurality of faraday cages connected to the test server, each faraday cage of the plurality of faraday cages configured to receive a wireless device of the plurality of wireless devices and having associated with it, a set of ports for connecting a faraday cage to the test server and to a wireless device associated with the faraday cage, each set of ports comprising:
  a wireless port connected to a wireless port on a test server and associated with an antenna internal to the faraday cage,
  a networking port connected to a networking port on the test server and associated with the networking port on the wireless device,
wherein the test controller employs web sockets to communicate with the test server such that the plurality of wireless devices may be tested simultaneously and independently of each other.

7. The test station of claim 6, further comprising:
a first virtualization container associated with the wireless port on the test server for running wireless tests; and
a second virtualization container associated with the networking port on the test server for running networking tests.

8. The test station of claim 6, further comprising a user interface connected to the test controller, and wherein communication between the user interface and the test server is via the test controller and is real-time, bidirectional, and asynchronous.

9. The test station of claim 6, wherein each set of ports further comprises a radio frequency port associated with a radio frequency port on an associated wireless device under test, and further comprising:
a Multimedia Over Coax Alliance (MoCA) Wide Area Network (WAN) harness associated with a first networking port on the test server;
a MoCA Local Area Network (LAN) harness associated with a second networking port on the test server; and
a splitter connected to the MoCA WAN harness, the MoCA LAN harness, and the radio frequency port on the faraday cage.

10. The test station of claim 9, wherein the radio frequency port on the associated wireless device under test comprises a coax connector.

11. The test station of claim 6, wherein the networking ports comprise Ethernet ports.

12. The test station of claim 6, wherein a signal path for the wireless tests is from the wireless port on the test server to the wireless port on the faraday cage to the antenna internal to the faraday cage to an antenna of the wireless device under test to the networking port of the wireless device under test to the networking port of the test server.

13. A test system for simultaneously and independently to sting a plurality of wireless devices under test, the test system comprising:
a test controller for managing a user interface associated with the test system;
a test server connected to the test controller; and
a plurality of faraday cages, each faraday cage of the plurality of faraday cages configured to receive a wireless device under test of a plurality of wireless devices under test and having associated with it, a set of ports for connecting a faraday cage to a wireless device under test associated with the faraday cage and to the test server, each set of ports comprising:
  a radio frequency port associated with a radio frequency port on an associated wireless device under test,
  a networking port associated with a networking port on the associated wireless device under test and connected to a networking port on the test server, the networking port on the test server being associated with a virtualization container for running networking tests,
wherein the test controller employs web sockets to communicate with the test server such that the plurality of wireless devices under test may be tested simultaneously and independently of each other and that communication between the user interfaces and the test server is real-time, bidirectional, and asynchronous.

14. The test system of claim 13, further comprising:
a Multimedia Over Coax Alliance (MoCA) Wide Area Network (WAN) harness associated with a first networking port on the test server;
a MoCA Local Area Network (LAN) harness associated with a second networking port on the test server; and
a splitter connected to the MoCA WAN harness, the MoCA LAN harness, and the radio frequency port on the faraday cage.

15. The test system of claim 14, wherein the radio frequency port on the associated wireless device under test comprises a coax connector.

16. The test system of claim 13, wherein the networking ports comprise Ethernet ports.

17. The test system of claim 13, wherein a signal path for the wireless tests is from the wireless port on the test server to the wireless port on the faraday cage to a first antenna internal to the faraday cage to a second antenna of the wireless device under test to the networking port of the wireless device under test to the networking port of the test server.

* * * * *